United States Patent
Cao et al.

(10) Patent No.: US 12,250,663 B2
(45) Date of Patent: Mar. 11, 2025

(54) UPLINK CROSS-CARRIER SCHEDULING FOR TIME DIVISION MULTIPLEXING CARRIER AGGREGATION

(71) Applicant: QUALCOMM Incorporated, San Diego, CA (US)

(72) Inventors: Yiqing Cao, Beijing (CN); Huilin Xu, Temecula, CA (US); Chenxi Hao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/597,796

(22) PCT Filed: Sep. 4, 2020

(86) PCT No.: PCT/CN2020/113462
§ 371 (c)(1),
(2) Date: Jan. 24, 2022

(87) PCT Pub. No.: WO2021/043258
PCT Pub. Date: Mar. 11, 2021

(65) Prior Publication Data
US 2022/0240234 A1    Jul. 28, 2022

(30) Foreign Application Priority Data

Sep. 6, 2019   (WO) ................ PCT/CN2019/104675

(51) Int. Cl.
*H04W 72/044*   (2023.01)
*H04L 5/00*     (2006.01)
*H04W 72/23*    (2023.01)

(52) U.S. Cl.
CPC ........... *H04W 72/044* (2013.01); *H04L 5/001* (2013.01); *H04W 72/23* (2023.01)

(58) Field of Classification Search
CPC .............. H04W 72/044; H04W 72/23; H04W 72/0453; H04L 5/001; H04L 5/0044;
(Continued)

(56) References Cited

U.S. PATENT DOCUMENTS 8,824,387  B2   9/2014   Chen et al.
10,849,125 B2  11/2020   Damnjanovic et al.
(Continued)

FOREIGN PATENT DOCUMENTS

CN   103369700 A   10/2013
EP   2360865 A1    8/2011
(Continued)

OTHER PUBLICATIONS

International Search Report and Written Opinion—PCT/CN2019/104675—ISA/EPO—May 26, 2020.
(Continued)

*Primary Examiner* — Diane L Lo
(74) *Attorney, Agent, or Firm* — Harrity & Harrity, LLP \ Qualcomm

(57) ABSTRACT

Various aspects of the present disclosure generally relate to wireless communication. In some aspects, a base station may configure an uplink transmission pattern related to an uplink transmission resource on multiple component carriers. The base station may transmit, to a user equipment (UE), information related to activating the uplink transmission pattern in a single scheduling message. Accordingly, the UE may transmit information on the multiple component carriers in one or more uplink symbols based at least in part on the uplink transmission pattern. Numerous other aspects are provided.

28 Claims, 10 Drawing Sheets

(58) Field of Classification Search
CPC ... H04L 5/0053; H04L 5/0051; H04L 5/0094; H04L 5/0098
See application file for complete search history.

(56) References Cited

U.S. PATENT DOCUMENTS

| | | |
|---|---|---|
| 2015/0173094 A1 | 6/2015 | Vangala et al. |
| 2017/0289968 A1* | 10/2017 | Marco ............... H04W 72/1268 |
| 2017/0289992 A1 | 10/2017 | Sun et al. |
| 2018/0219649 A1 | 8/2018 | Ying et al. |
| 2019/0090258 A1* | 3/2019 | Ryu ..................... H04L 1/1861 |
| 2019/0149288 A1* | 5/2019 | Hosseini ............... H04W 72/23 370/329 |
| 2020/0275383 A1* | 8/2020 | Yang ................... H04W 52/146 |
| 2021/0067189 A1* | 3/2021 | Yu ....................... H04W 52/367 |
| 2022/0159706 A1* | 5/2022 | Panteleev ................. H04L 1/08 |
| 2022/0166541 A1* | 5/2022 | Takeda ................. H04L 1/1864 |
| 2022/0231789 A1* | 7/2022 | Ying ....................... H04L 1/189 |

FOREIGN PATENT DOCUMENTS

| | | |
|---|---|---|
| EP | 3448092 A1 | 2/2019 |
| WO | WO-2011116365 A2 | 9/2011 |
| WO | 2012022368 A1 | 2/2012 |
| WO | WO-2016123473 | 8/2016 |
| WO | 2017138794 A2 | 8/2017 |

OTHER PUBLICATIONS

International Search Report and Written Opinion—PCT/CN2020/113462—ISA/EPO—Dec. 2, 2020.
LG Electronics: "Discussion on Common Aspects in TDD NB-IoT", 3GPP TSG RAN WG1 Meeting 92, R1-1802179, Mar. 2, 2018 (Mar. 2, 2018), 11 pages, the whole document.
ZTE: "Considerations on Scheduling in Carrier Aggregation", 3GPP TSG RAN WG2 Meeting #66 bis, R2-093886, Los Angeles, USA, Jun. 29-Jul. 3, 2009, 5 Pages.
Supplementary European Search Report—EP20861804—Search Authority—The Hague—Aug. 29, 2023.
Taiwan Search Report—TW109130424—TIPO—Jan. 30, 2024.

* cited by examiner

UPLINK CROSS-CARRIER SCHEDULING FOR TIME DIVISION MULTIPLEXING CARRIER AGGREGATION

CROSS-REFERENCE TO RELATED APPLICATIONS

This Patent Application is a 371 national stage of PCT Application No. PCT/CN2020/113462 filed on Sep. 4, 2020, entitled "UPLINK CROSS-CARRIER SCHEDULING FOR TIME DIVISION MULTIPLEXING CARRIER AGGREGATION," which claims priority to PCT Application No. PCT/CN2019/104675, filed on Sep. 6, 2019, entitled "UPLINK CROSS-CARRIER SCHEDULING FOR TIME DIVISION MULTIPLEXING CARRIER AGGREGATION," which are hereby expressly incorporated by reference herein.

FIELD OF THE DISCLOSURE

Aspects of the present disclosure generally relate to wireless communication and to techniques and apparatuses for uplink cross-carrier scheduling for time division multiplexing (TDM) carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a base station, may include: configuring an uplink transmission pattern related to an uplink transmission resource on multiple component carriers; and transmitting, to a user equipment (UE), information related to activating the uplink transmission pattern in a single scheduling message.

In some aspects, a method of wireless communication, performed by a UE, may include: receiving, from a base station, a single scheduling message including information related to activating an uplink transmission pattern related to an uplink transmission resource on multiple component carriers; and transmitting information on the multiple component carriers in one or more uplink symbols based at least in part on the uplink transmission pattern.

In some aspects, a base station for wireless communication may include a memory and one or more processors coupled to the memory. The memory and the one or more processors may be configured to: configure an uplink transmission pattern related to an uplink transmission resource on multiple component carriers; and transmit, to a UE, information related to activating the uplink transmission pattern in a single scheduling message.

In some aspects, a UE for wireless communication may include a memory and one or more processors coupled to the memory. The memory and the one or more processors may be configured to: receive, from a base station, a single scheduling message including information related to activating an uplink transmission pattern related to an uplink transmission resource on multiple component carriers; and transmit information on the multiple component carriers in one or more uplink symbols based at least in part on the uplink transmission pattern.

In some aspects, a non-transitory computer-readable medium may store one or more instructions for wireless communication. The one or more instructions, when executed by one or more processors of a base station, may cause the one or more processors to: configure an uplink transmission pattern related to an uplink transmission resource on multiple component carriers; and transmit, to a UE, information related to activating the uplink transmission pattern in a single scheduling message.

In some aspects, a non-transitory computer-readable medium may store one or more instructions for wireless communication. The one or more instructions, when executed by one or more processors of a UE, may cause the one or more processors to: receive, from a base station, a single scheduling message including information related to activating an uplink transmission pattern related to an uplink transmission resource on multiple component carriers; and transmit information on the multiple component carriers in one or more uplink symbols based at least in part on the uplink transmission pattern.

In some aspects, an apparatus for wireless communication may include means for configuring an uplink transmission pattern related to an uplink transmission resource on multiple component carriers; and means for transmitting, to a UE, information related to activating the uplink transmission pattern in a single scheduling message.

In some aspects, an apparatus for wireless communication may include means for receiving, from a base station, a single scheduling message including information related to activating an uplink transmission pattern related to an uplink transmission resource on multiple component carriers; and means for transmitting information on the multiple component carriers in one or more uplink symbols based at least in part on the uplink transmission pattern.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
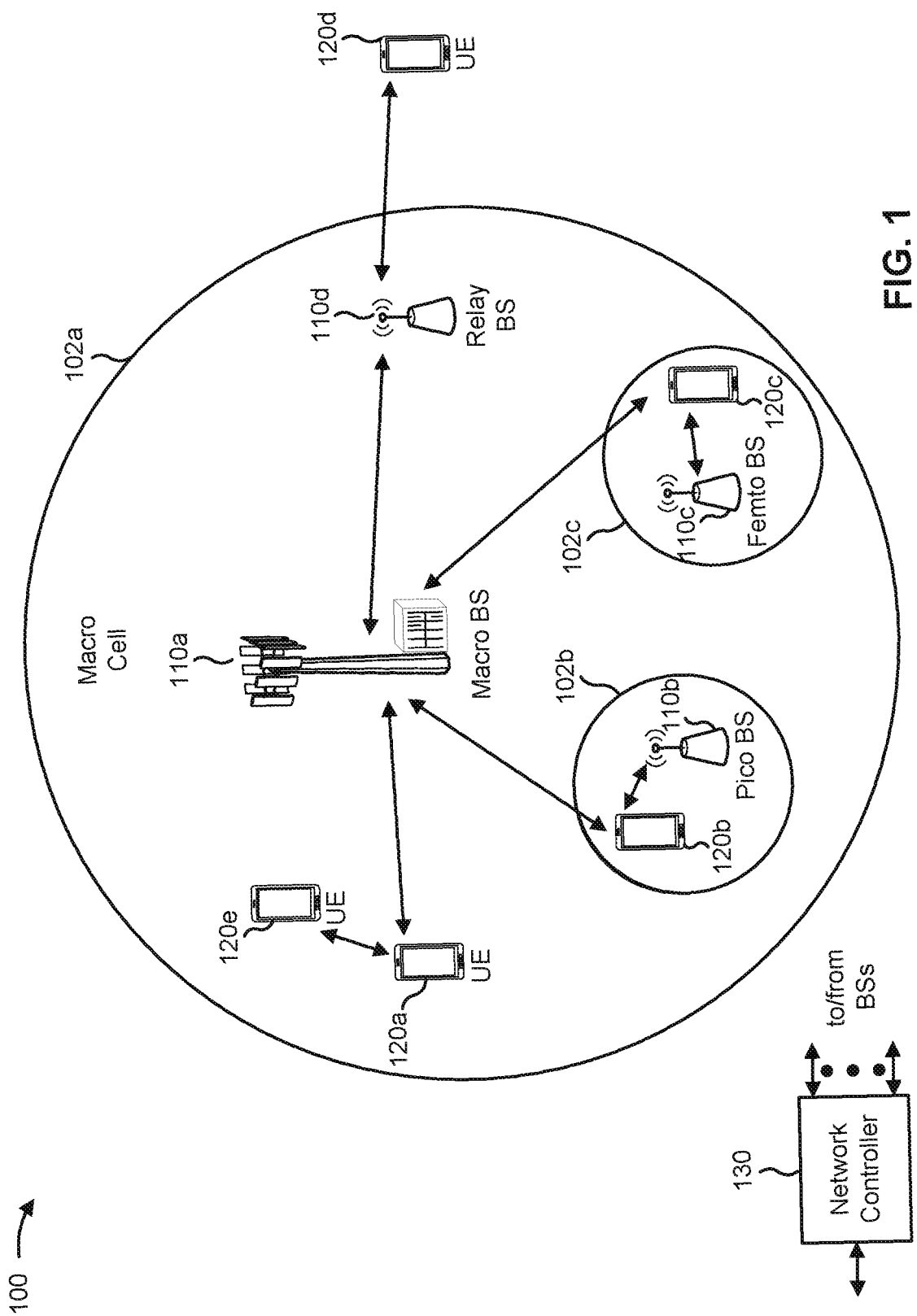
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
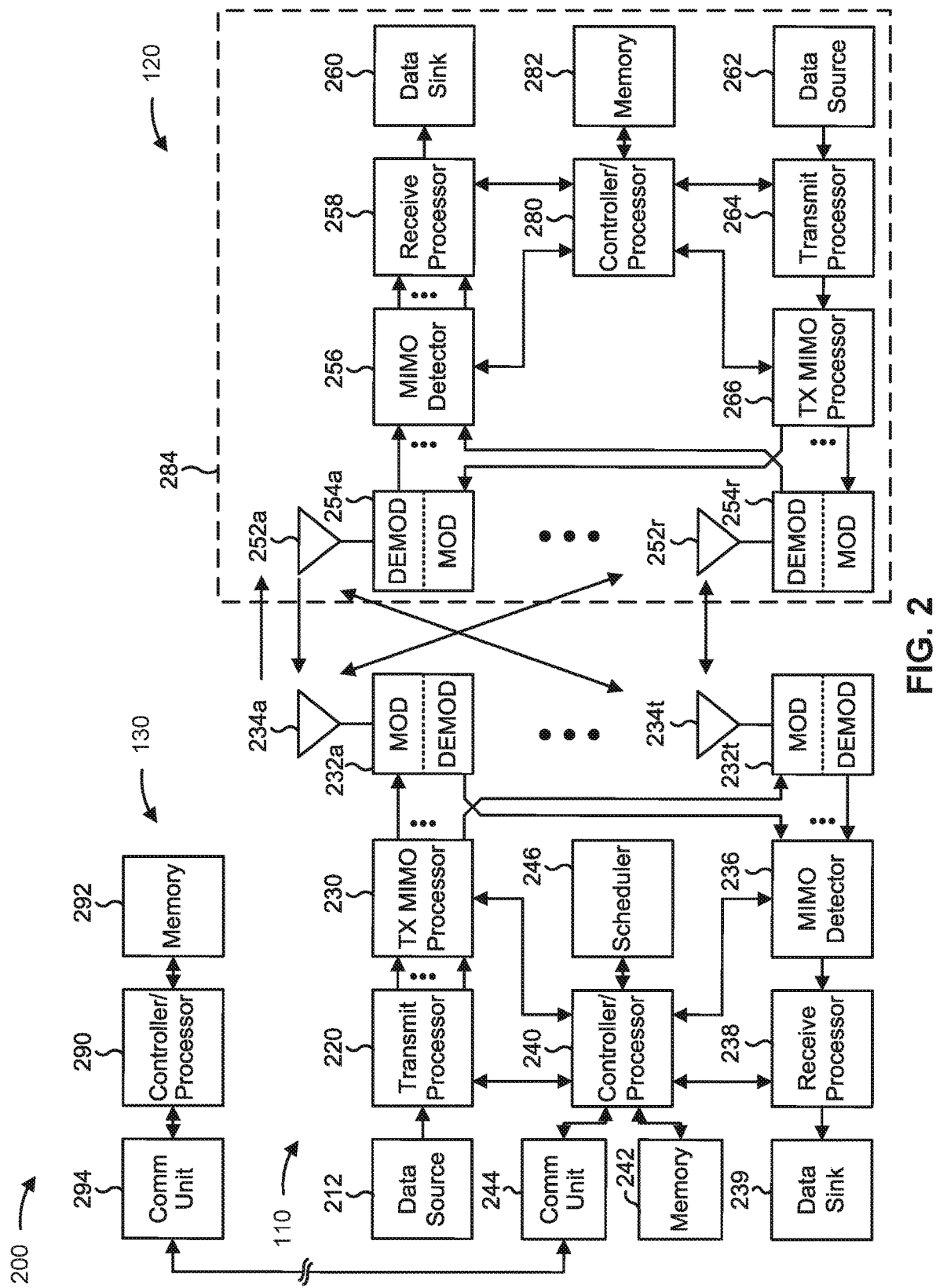
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with uplink cross-carrier scheduling for time division multiplexing (TDM) carrier aggregation (CA), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, base station 110 may include means for configuring an uplink transmission pattern related to an uplink transmission resource on multiple component carriers, means for transmitting, to UE 120, information related to activating the uplink transmission pattern in a single scheduling message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving, from base station 110, a single scheduling message including information related to activating an uplink transmission pattern related to an uplink transmission resource on multiple component carriers, means for transmitting information on the multiple component carriers in one or more uplink symbols based at least in part on the uplink transmission pattern, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
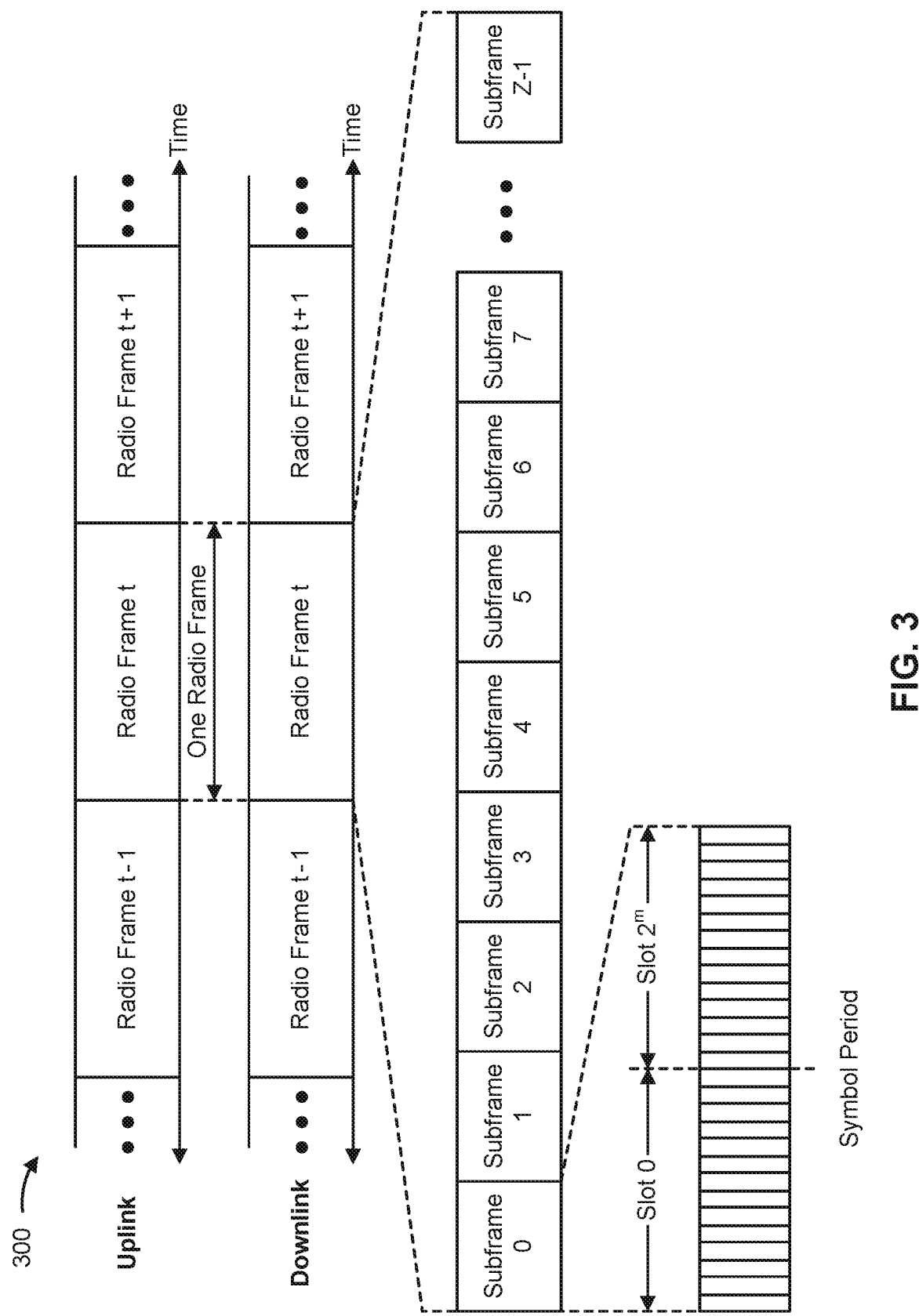
FIG. 3 is a diagram illustrating an example frame structure in a wireless network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, the base station may transmit the PSS, the SSS, and/or the PBCH in a synchronization signal block (SSB).

As indicated above, FIG. 3 is provided as an example. Other examples may differ from what is described with regard to FIG. 3.

Figure 4:
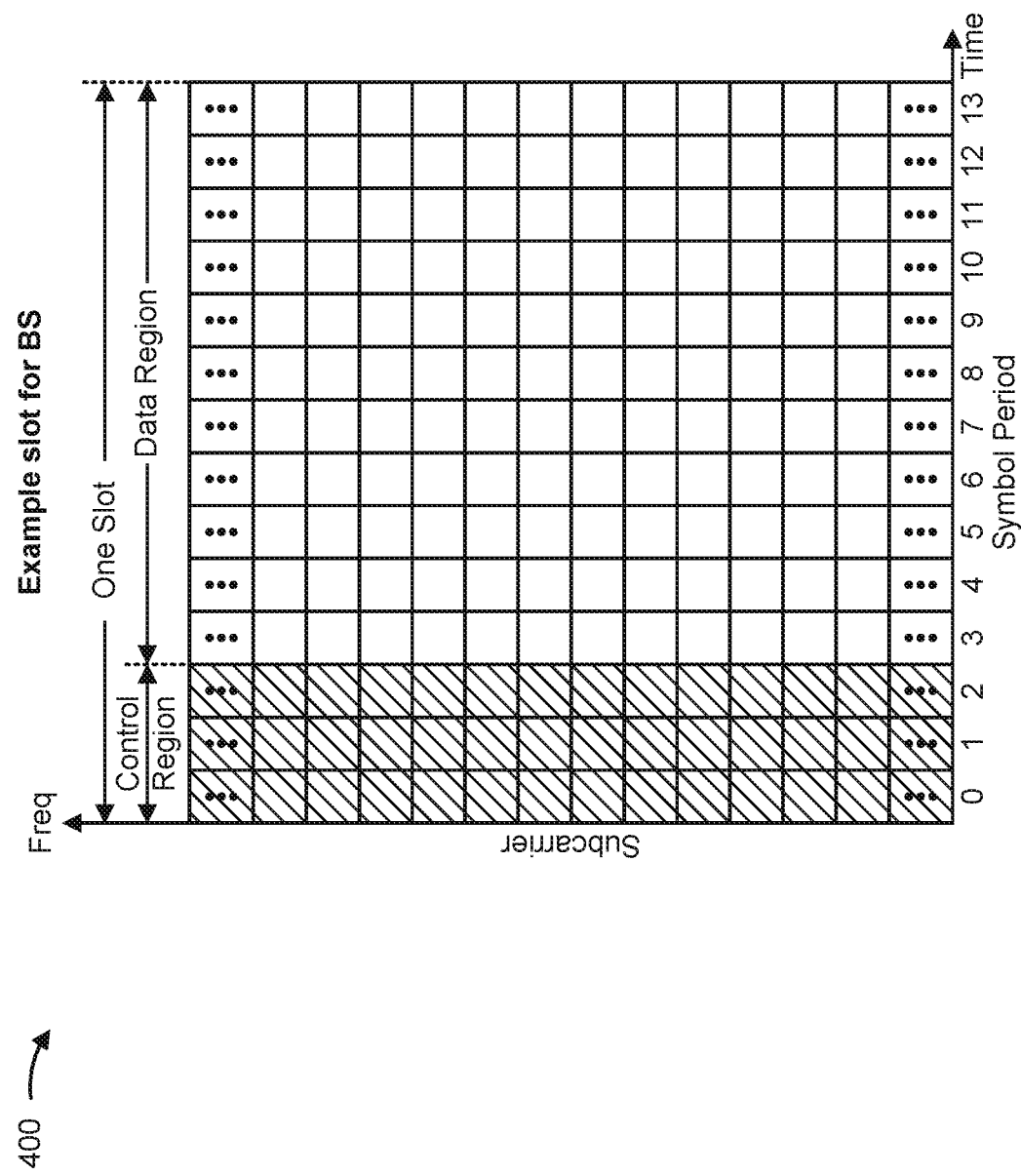
FIG. 4 is a diagram illustrating an example slot format with a normal cyclic prefix, in accordance with various aspects of the present disclosure.

FIG. 4 shows an example slot format 400 with a normal cyclic prefix. The available time and frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), a signal-to-noise ratio (SNR), a reference signal received power (RSRP), a log likelihood ratio (LLR), a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
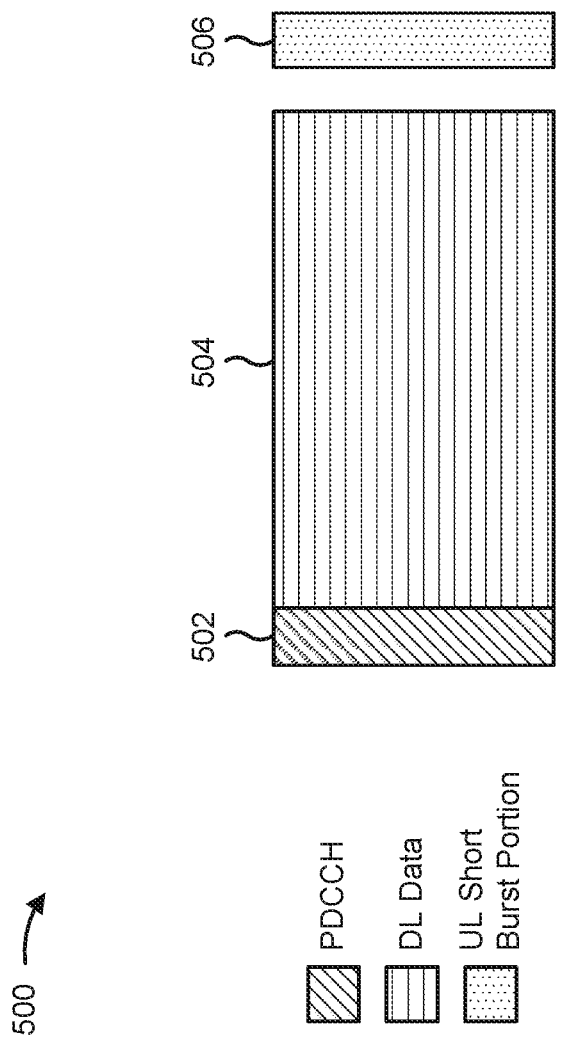
FIG. 5 is a diagram illustrating an example of a downlink-centric slot, in accordance with various aspects of the present disclosure.

FIG. 5 is a diagram showing an example DL-centric slot 500 or wireless communication structure. The DL-centric slot 500 may include a control portion 502. The control portion 502 may exist in the initial or beginning portion of the DL-centric slot 500. The control portion 502 may include various scheduling information and/or control information corresponding to various portions of the DL-centric slot 500. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot 500 may also include a DL data portion 504. The DL data portion 504 may sometimes be referred to as the payload of the DL-centric slot 500. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot 500 may also include an uplink (UL) short burst portion 506. The UL short burst portion 506 may sometimes be referred to as an uplink burst, an uplink burst portion, a common uplink burst, a short burst, an uplink short burst, a common uplink short burst, a common uplink short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot 500. For example, the UL short burst portion 506 may include feedback information corresponding to the control portion 502 and/or the DL data portion 504. Non-limiting examples of information that may be included in the UL short burst portion 506 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without deviating from the aspects described herein.

As indicated above, FIG. 5 is provided as an example. Other examples may differ from what is described with regard to FIG. 5.

Figure 6:
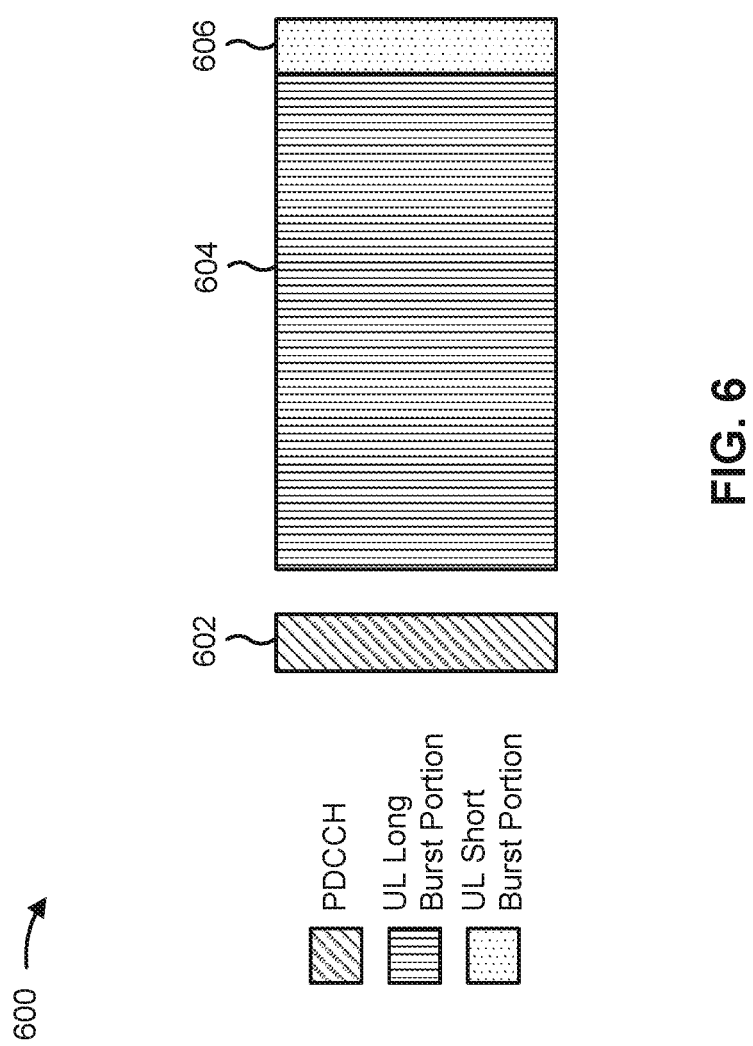
FIG. 6 is a diagram illustrating an example of an uplink-centric slot, in accordance with various aspects of the present disclosure.

FIG. 6 is a diagram showing an example of an uplink (UL)-centric slot 600 or wireless communication structure. The UL-centric slot 600 may include a control portion 602. The control portion 602 may exist in the initial or beginning portion of the UL-centric slot. The control portion 602 in FIG. 6 may be similar to the control portion 502 described above with reference to FIG. 5. The UL-centric slot 600 may also include an uplink (UL) long burst portion 604. The UL long burst portion 604 may sometimes be referred to as the payload of the UL-centric slot 600. The term "UL portion" may refer to the communication resources utilized to communicate UL data from the subordinate entity (e.g., UE) to the scheduling entity (e.g., UE or BS). In some configurations, the control portion 602 may be a physical downlink control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot 600 may also include an uplink short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

As indicated above, FIG. 6 is provided as an example. Other examples may differ from what is described with regard to FIG. 6.

Figure 7:
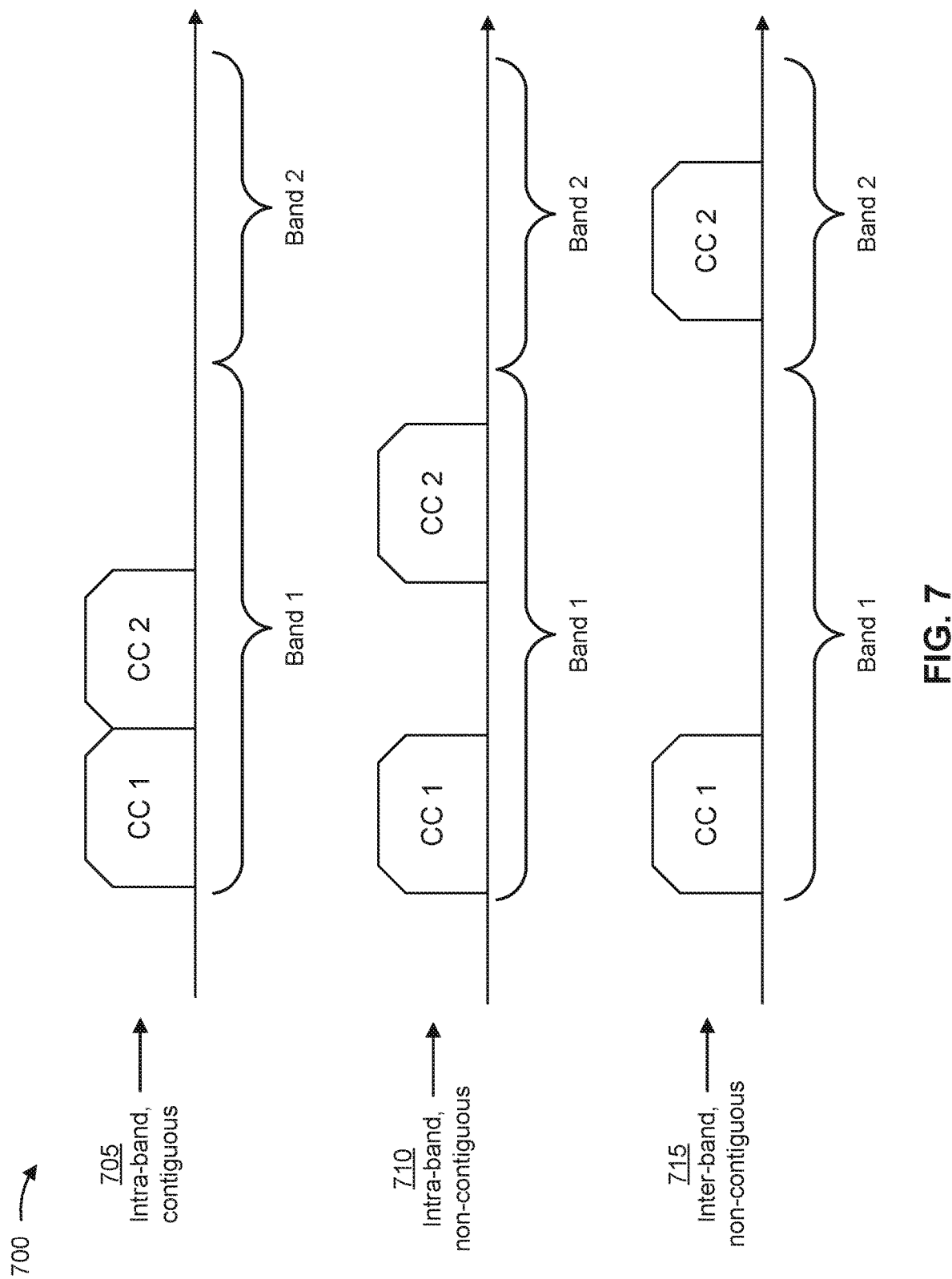
FIG. 7 is a diagram illustrating examples of carrier aggregation, in accordance with various aspects of the present disclosure.

FIG. 7 is a diagram illustrating examples 700 of carrier aggregation, in accordance with various aspects of the present disclosure.

Carrier aggregation is a technology that enables two or more component carriers (CCs, sometimes referred to as carriers) to be combined (e.g., into a single channel) for a single UE to enhance data capacity. As shown, component carriers can be combined in the same or different frequency bands, the same or different frequency ranges, and/or the like. Additionally, or alternatively, contiguous or non-contiguous component carriers can be combined. A base station may configure carrier aggregation for a UE, such as in a radio resource control (RRC) message, downlink control information (DCI), and/or the like.

As shown by reference number 705, in some aspects, carrier aggregation may be configured in an intra-band contiguous mode where the aggregated component carriers are contiguous to one another and are in the same frequency band. As shown by reference number 710, in some aspects, carrier aggregation may be configured in an intra-band non-contiguous mode where the aggregated component carriers are in the same frequency band and are non-contiguous to one another. As shown by reference number 715, in some aspects, carrier aggregation may be configured in an inter-band non-contiguous mode where the aggregated component carriers are non-contiguous to one another and are in different frequency bands.

As indicated above, FIG. 7 is provided as an example. Other examples may differ from what is described with regard to FIG. 7.

In carrier aggregation, a UE and a base station may communicate via multiple carriers that may have different frequencies, which may be contiguous within a particular frequency band, non-contiguous within a particular frequency band, non-contiguous across different frequency bands within a particular frequency range, non-contiguous across different frequency bands within different frequency ranges, and/or the like. For example, in NR, frequency bands may be separated into different frequency ranges, which may include Frequency Range 1 (FR1) that includes frequency bands below 6 gigahertz (GHz) (also known as sub-6 GHz) and Frequency Range 2 (FR2) that includes millimeter wave (mmW) frequency bands. In general, carrier aggregation features can enable increased bandwidth, increased throughput, increased reliability, and/or the like for communications between the UE and the base station (e.g., enabling cross-carrier communication based at least in part on different spectrum usage techniques). For example, frequency division duplexing (FDD) and time division duplexing (TDD) are two spectrum usage techniques that can be used in a wireless communication system. In particular, in a frequency band that operates in FDD mode, two different component carriers (or carrier frequencies) are paired and simultaneously used for the uplink and the downlink with a guard band separating the two component carriers to ensure that the transmitter and receiver do not interfere with one another. In contrast, in a frequency band that operates in TDD mode, a single component carrier is used for both transmit and receive operations in alternating time slots.

In general, FDD mode and TDD mode may be associated with respective tradeoffs. For example, whereas FDD mode consumes substantial frequency spectrum due to requiring paired uplink and downlink spectrum and a guard band, TDD mode does not use paired spectrum and can therefore be implemented in any available spectrum without requiring any spectrum-wasteful guard bands or channel separations. Furthermore, because the proportion of time slots that are allocated to uplink and downlink traffic can be dynamically varied, TDD mode can more efficiently serve application traffic that may require asymmetric data rates (e.g., more time slots can be allocated to the downlink to support a higher data rate on the downlink). Another advantage of TDD mode is that channel propagation is the same in both the uplink and downlink directions, which enables special antenna techniques such as multiple-input multiple-output (MIMO) and beamforming that otherwise require more complex dynamic tuning circuitry in FDD mode to make antenna bandwidths broad enough to cover both sets of paired spectrum (and the intervening, unused, guard band).

However, because TDD mode operates based at least in part on allocated time slots, a successful TDD implementation depends on a very precise phase and/or timing synchronization to avoid interference between uplink and downlink transmissions, which means that FDD mode can potentially achieve a higher data rate than TDD mode over a similar distance because paired spectrum is used on a continuous basis in both the uplink and downlink directions. Furthermore, another advantage of FDD mode is that radio planning tends to be easier and more efficient because neighboring base stations transmit and receive in different sub-bands, component carriers, and/or the like. On the other hand, in TDD mode, spectral efficiency may be decreased because a guard time is maintained between neighboring base stations, or neighboring base stations may be synchronized to transmit and receive at the same time, which increases network complexity and cost in addition to reducing scheduling flexibility because all neighboring base stations have to use the same uplink to downlink ratio.

Accordingly, due to the respective advantages and tradeoffs associated with FDD mode and TDD mode, some inter-band carrier aggregation scenarios may involve concurrent deployment of TDD mode and FDD mode in different frequency bands, component carriers, and/or the like. For example, because TDD mode uses less spectrum than FDD mode, permits time slots to asymmetrically allocated to the uplink and the downlink based at least in part on application (e.g., quality of service) requirements, simplifies MIMO, beamforming, and other special antenna techniques due to channel reciprocity, and/or the like, NR networks are expected to use frequency bands that operate in TDD mode (e.g., the n78 band) as a primary cell (Pcell). Furthermore, some mobile network operators (MNOs) may deploy NR on frequency bands that operate in FDD mode as a secondary cell (Scell) because FDD mode potentially offers better coverage performance, lower costs, and/or the like due to low penetration compared with frequency bands that operate in TDD mode, reduced HARQ latency because the uplink is always available, and/or the like. However, there may be various challenges with concurrently deploying one or more component carriers in the Pcell and one or more component carriers in the Scell with inter-band carrier aggregation, especially with respect to uplink transmissions.

For example, inter-band carrier aggregation may be associated with a configuration in which one or more FDD component carriers in a first frequency band are combined with one or more TDD component carriers in a second frequency band, a configuration in which one or more TDD component carriers in a first frequency band are combined with one or more TDD component carriers in a second frequency band, and/or the like. In general, inter-band carrier aggregation may be implemented using time division multiplexing (TDM), meaning that a UE can perform only one uplink transmission in any given time interval (e.g., via either a Pcell or an Scell) to avoid thermal issues that may otherwise arise if a UE were to perform simultaneous transmissions via the Pcell and one or more Scells, via different Scells, and/or the like.

Furthermore, another consideration relates to scheduling efficiency for inter-band carrier aggregation implemented using TDM. For example, in some cases, one or more uplink transmission resources may be reserved to a UE, a group of UEs, and/or the like to reduce transmission latency, reduce scheduling overhead, and/or the like. In particular, in LTE networks, semi-persistent scheduling (SPS) generally enables radio resources to be semi-statically configured and allocated to a specific UE for more than one subframe, which may avoid the need for specific downlink assignment messages over a physical downlink control channel (PDCCH) for each subframe. To configure SPS, radio resource control (RRC) signaling may indicate an interval at which the radio resources are periodically assigned. PDCCH signaling may indicate specific transmission resource allocations in a time/frequency domain and further indicate one or more transmission attributes (e.g., periodicity, modulation and control scheme (MCS), time offset, transmit power, and/or the like). For uplink SPS, non-adaptive synchronous hybrid automatic repeat request (HARD) is performed. For example, non-adaptive retransmissions may be performed on a same resource and with a same MCS as was used for a last (e.g., previous) transmission. Furthermore, to support certain service types (e.g., ultra reliable low latency communication (URLLC), enhanced mobile broadband (eMBB), massive machine-type communications (MMTC), and/or the like) that may have different requirements with respect to reliability, latency, data rates, communication range, and/or the like, NR networks may support two types of reserved uplink transmission resources to enable uplink transmissions without a grant, generally referred to as a configured grant (CG). More particularly, in a Type 1 configured grant, a UE can perform uplink data transmission without a grant based at least in part on an RRC (re) configuration without any L1 signaling, and in a Type 2 configured grant, the UE can perform uplink data transmission without a grant based at least in part on RRC (re) configuration in combination with L1 signaling to activate and/or release the Type 2 configured grant.

In NR networks, carrier aggregation may be supported through self-scheduling in which an Scell uplink is scheduled by the corresponding Scell downlink (e.g., the downlink spectrum paired with the uplink spectrum) and/or through cross-carrier scheduling in which the Pcell schedules both and the Scell uplink and the Scell downlink (e.g., in one or more downlink slots based at least in part on the TDD configuration). However, because the uplink is time division multiplexed (or "TDMed"), scheduling the Scell uplink may interrupt an uplink SPS configuration on the same carrier in one or more slots, which may necessitate dynamic scheduling for the interrupted slot(s). Furthermore, similar issues may arise with respect to an uplink configured grant that is reserved to UEs at a group level, a cell level, and/or the like to enable UEs to perform a fast uplink transmission. However, in addition to potentially interrupting one or more slots in which a UE can perform an uplink transmission based at least in part on the uplink configured grant, further challenges may arise because a configured grant typically supports repetition of the same symbol in subsequent consecutive slots (e.g., to improve reliability). Accordingly, in cases where a UE is assigned one or more reserved uplink resources on a particular carrier (e.g., an uplink SPS configuration, a configured grant, and/or the like), a scheduling message related to TDM carrier aggregation on another carrier may interrupt usage of the one or more reserved uplink resources, cause failure of repetition of the same symbol in subsequent consecutive slots, and/or the like.

Some aspects described herein provide techniques and apparatuses that may combine one or more uplink transmission patterns with uplink cross-carrier SPS and configured grant scheduling for TDM carrier aggregation. For example, as will be described in further detail below, the uplink transmission pattern for an uplink SPS configuration may be provided or otherwise indicated to the UE in an RRC signaling message, and a subsequent downlink control information (DCI) message can be used to activate the uplink SPS configuration. For example, the uplink transmission pattern may include a periodicity of the uplink SPS configuration in a quantity of slots, an expiration timer expressed according to a number of milliseconds, band information and a related transmission pattern, and/or the like. Additionally, or alternatively, for a band-specific configured grant, an RRC configuration may include an information element (IE) (e.g., rrc-ConfiguredUplinkGrant) to indicate a frequency and/or band, define a frequency and time resource for each frequency and/or band, indicate a user time domain offset or define a slot-level offset value, and/or the like. In this way, the UE may be informed about which reserved uplink resources may potentially be interrupted, which allows the UE to perform one or more uplink transmissions (e.g., via the Pcell, the Scell, and/or the like) to avoid the potential interruption. Furthermore, in the case of an uplink configured grant, the UE may perform repetition in consecutive slots in a manner that avoids one or more slots that are indicated to be unavailable in the RRC IE.

Furthermore, in addition to the above-mentioned challenges that relate to scheduling efficiency, enabling TDM carrier aggregation based at least in part on TDD operation in the Pcell, and FDD and/or TDD operation in one or more Scells, poses challenges with respect to compliance with limits, requirements, and/or the like that relate to a Specific Absorption Rate (SAR), which refers to a rate at which the human body absorbs energy when exposed to radio frequency (RF) signals (e.g., power absorbed per mass of tissue, which may be expressed according to watts per kilogram (W/kg)). In particular, SAR requirements generally specify that overall radiated power by a UE is to remain under a certain level for human safety. Accordingly, a UE operating at a high transmit power in the Pcell or TDD band (e.g., based at least in part on a network configuration) may have to reduce an uplink transmission duty cycle on the Scell(s) in order to adhere to or otherwise comply with an SAR requirement, which may prevent the UE from using all available uplink slots to transmit. For example, a percentage of allowed uplink transmissions on the Scell(s) may depend on the uplink transmissions on the Pcell or TDD band, which is generally configured or otherwise scheduled by a base station and the UE only needs to follow the scheduling by the base station. Accordingly, a reserved uplink resource (e.g., an uplink SPS configuration, configured grant, and/or the like) may allow a UE to exceed the SAR requirement in cases where the UE is unaware of a limit on allowed uplink transmissions. Furthermore, without knowing UE-specific allowed uplink transmission information, a base station may pessimistically configure a cell-specific value for allowed uplink transmissions based at least in part on an assumption that the UE will use all available uplink transmission slots with a maximum power to guarantee that the UE will not exceed the SAR requirement.

Accordingly, some aspects described herein provide techniques and apparatuses that may configure a UE-specific duty cycle pattern (e.g., a percentage of slots in which uplink transmissions are allowed on an Scell) to fractionally increase uplink transmission power. For example, to increase uplink transmission power, the UE-specific duty cycle pattern may have a reduced quantity of uplink transmission slots (e.g., dividing a total allowed uplink transmission power among a smaller quantity of slots may result in an increase of uplink transmission power per slot). In some aspects, in cases where TDM inter-band carrier aggregation is implemented with a combination of one or more TDD component carriers in a first frequency band and one or more FDD component carriers in a second frequency band, the Pcell may configure the duty cycle pattern such that the UE operates at a higher power in the TDD band because the higher power can support uplink MIMO to increase overall uplink throughput and because the FDD band may have a smaller bandwidth than the TDD band (e.g., 20 MHz versus 100 MHz), whereby operating at a relatively lower power may not cause excessive performance degradation. Accordingly, to configure the TDD band with a higher power, the UE-specific duty cycle pattern may be configured such that at least some uplink transmission slots in the FDD band are unused to satisfy the SAR requirement, and the UE may comply with the SAR requirement by following the configuration provided in the UE-specific duty cycle pattern when performing uplink transmissions.

Figure 8:
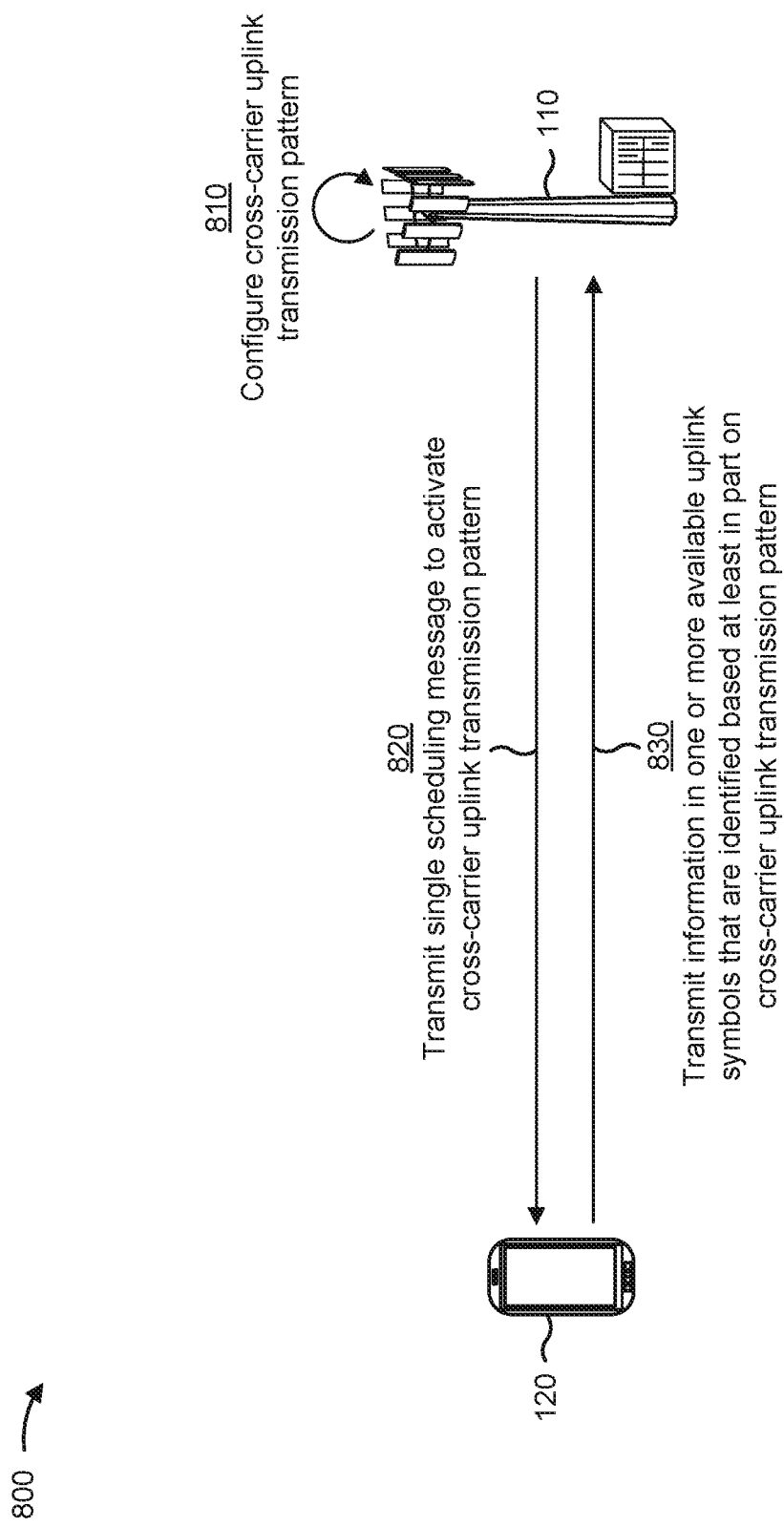
FIG. 8 is a diagram illustrating an example of uplink cross-carrier scheduling for time division multiplexing carrier aggregation, in accordance with various aspects of the present disclosure.

FIG. 8 is a diagram illustrating an example 800 of uplink cross-carrier scheduling for time division multiplexing (TDM) carrier aggregation, in accordance with various aspects of the present disclosure. As shown in FIG. 8, a UE 120 may be in communication with a base station 110 in a wireless network (e.g., wireless network 100 and/or the like). Furthermore, as described herein, the UE 120 and the base station 110 may communicate using an inter-band carrier aggregation configuration. For example, in some aspects, the inter-band carrier aggregation configuration may include one or more component carriers in a first frequency band that is configured in a TDD mode and one or more component carriers in a second frequency band that is configured in an FDD mode. Additionally, or alternatively, the inter-band carrier aggregation configuration may include one or more component carriers in a first frequency band that is configured in a TDD mode and one or more component carriers in a second frequency band that is also configured in an TDD mode.

As shown in FIG. 8, and by reference number 810, the base station 110 may configure a cross-carrier uplink transmission pattern based at least in part on one or more reserved uplink resources that are assigned to the UE 120, based at least in part on an SAR requirement applicable to the UE 120, and/or the like. For example, as mentioned above, the cross-carrier uplink transmission pattern may generally relate to an uplink transmission pattern to be used in a TDM carrier aggregation scenario, where the base station 110 may be configured to communicate with the UE 120 via a Pcell including one or more component carriers in a first frequency band operating in TDD mode, via one or more Scells including one or more component carriers in a second frequency band operating in FDD mode and/or TDD mode, and/or the like. In some aspects, the cross-carrier uplink transmission pattern may indicate a set of one or more slots, symbols, subframes, and/or the like associated with a TDM pattern that are available to use for the reserved uplink resource(s) assigned to the UE 120 across multiple frequency bands, multiple component carriers within a particular frequency band, and/or the like. For example, in some aspects, the cross-carrier uplink transmission pattern may indicate that the set of one or more slots, symbols, subframes, and/or the like can be used to perform one or more uplink transmissions, one or more repetitions of an uplink transmission, and/or the like (e.g., when one or more messages used to schedule the one or more Scells interrupt usage of the reserved uplink resource(s) assigned to the UE 120).

In some aspects, the base station 110 may determine the cross-carrier uplink transmission pattern based at least in part on hard coded information stored in a memory of the base station (e.g., according to a cross-carrier uplink transmission pattern indicated in a 3GPP standard for the reserved uplink resource(s) assigned to the UE 120, the SAR requirement applicable to the UE 120, and/or the like). Additionally, or alternatively, the base station 110 may determine the cross-carrier uplink transmission pattern based at least in part on scheduling information derived at the base station 110 (e.g., based at least in part on the reserved uplink resource(s) assigned to the UE 120, the SAR requirement applicable to the UE 120, and/or the like). Furthermore, in some aspects, the information that the base station 110 uses to derive or otherwise determine the cross-carrier uplink transmission pattern (e.g., the hard coded information, the scheduling information, and/or the like) may be transparent to the UE 120, which may follow the cross-carrier uplink transmission pattern as indicated in one or more scheduling messages that the base station 110 transmits to the UE 120, as further described elsewhere herein.

In some aspects, to configure the cross-carrier uplink transmission pattern based at least in part on one or more reserved uplink resources that are assigned to the UE 120, the base station 110 may use different approaches depending on whether the reserved uplink resources include an uplink SPS configuration, an uplink configured grant, and/or the like. For example, in cases where the reserved uplink resources include an uplink SPS configuration, the uplink transmission pattern may be configured via RRC signaling, and a subsequent DCI message may be used to activate the uplink SPS configuration. In some aspects, the uplink SPS configuration may include a periodicity of the uplink SPS configuration (e.g., a quantity of slots) and an expiration timer (e.g., a quantity of milliseconds). Furthermore, the uplink SPS configuration may include information related to one or more bands that are associated with the uplink SPS configuration and the transmission patterns to be used on the one or more bands. In this way, by configuring the transmission pattern for one particular band (e.g., the Pcell operating in TDD mode, an Scell operating in FDD mode, an Scell operating in TDD mode, and/or the like), the transmission pattern may be applied across all bands with no interruption to the uplink SPS configuration. For example, for a TDD band, the UE 120 may use any available uplink slots based at least in part on the applicable TDD configuration, and the UE 120 may similarly use any of the available uplink slots for an FDD band because the uplink is always available. In some aspects, the base station 110 may additionally configure the DCI message to activate the uplink SPS configuration. For example, the DCI message may include one or more resources (e.g., symbols, resource blocks (RBs), and/or the like) associated with the transmission pattern and an SPS radio network temporary identifier (SPS-RNTI) that may be included in a content of the DCI message, scrambled with a cyclic redundancy code (CRC), and/or the like. Additionally, or alternatively, the one or more resources associated with the transmission pattern may be included in the RRC signaling under information associated with each band.

Furthermore, in cases where the reserved uplink resources include an uplink configured grant, the uplink transmission pattern may be a band-specific configuration that is configured via RRC signaling. For example, an RRC message may include an information element (IE) related to the uplink configured grant, such as a ConfiguredGrantConfig IE. In some aspects, the IE related to the uplink configured grant may include one or more fields or elements to indicate a list of one or more frequencies and/or bands associated with the uplink configured grant and one or more fields or elements to define one or more frequency resources, one or more time resources, and/or the like for each frequency and/or band. In this way, the base station 110 can configure the list of frequencies and/or bands associated with the uplink configured grant and the frequency and/or time resources to define the uplink transmission pattern to be used for each frequency and/or band (e.g., slots that are available for uplink transmission, slots that are unavailable for uplink transmission, and/or the like). Furthermore, in some aspects, the IE related to the uplink configured grant may include a user time domain offset (e.g., related to a single frequency network (SFN)) and/or one or more fields or elements to define a slot-level offset (e.g., to account for cases in which a frame structure may exceed a maximum value of the time domain offset). In this way, the UE 120 may know which slots are available and which slots are unavailable for uplink transmission, and may thereby repeat one or more transmissions and/or avoid repeating one or more transmissions in consecutive slots based at least in part on the slot(s) availability indicated by the above information in the RRC IE.

Furthermore, to ensure compliance with the SAR requirement applicable to the UE 120, the base station 110 may configure the cross-carrier uplink transmission pattern based at least in part on an overall fraction of transmission slots that the UE 120 is allowed to use for an FDD uplink. In this case, the base station 110 may be aware of a quantity of TDD slots that the UE 120 is using to transmit at a high power and derive a quantity of uplink slots that the UE 120 is permitted to use in an FDD band based at least in part on the quantity of TDD slots that the UE 120 is using to transmit at a high power. Furthermore, in cases where the UE 120 is assigned a reserved uplink transmission resource that allows the UE 120 to transmit without having to first provide an uplink scheduling request (e.g., an uplink SPS configuration, an uplink configured grant, and/or the like), the UE 120 could potentially exceed the SAR requirement if the UE 120 does not know how many slots can be used for FDD uplink transmissions. Accordingly, the base station 110 may configure the cross-carrier uplink transmission pattern based at least in part on a maximum quantity of slots that can be used for FDD uplink transmissions, which can then be indicated to the UE 120 to ensure short-term and long-term compliance with the SAR requirement. In some aspects, the base station 110 may determine the maximum quantity of slots that can be used for FDD uplink transmissions without violating the SAR requirement based at least in part on UE-specific information, which avoids a need to pessimistically configure the maximum quantity of slots based on the (potentially incorrect) assumption that the UE 120 will use a maximum transmit power in all available uplink TDD slot(s).

For example, in some aspects, the base station 110 may configure a DCI message to indicate an allowed uplink transmission pattern that may be designed to guarantee short-term (e.g., substantially real-time) compliance with the SAR requirement. In some aspects, the DCI message may be dynamically configured to guarantee short-term compliance with the SAR requirement within a few slots, a single slot, a portion of a single slot, and/or the like. For example, in some aspects, the base station 110 may configure the DCI message to include one or more elements related to an uplink grant to indicate, to the UE 120, the allowed uplink transmission pattern to be in effect until a next scheduling message (e.g., a UE-specific duty cycle indicating a percentage or quantity of allowed slots for FDD uplink transmission). In some aspects, the allowed uplink transmission pattern may include a quantity of slots and/or symbols available for FDD uplink transmission, which the base station 110 may derive based at least in part on an actual transmit power used by the UE 120 in one or more scheduled symbols associated with the uplink grant (e.g., an amount of energy the UE 120 is already using during the one or more scheduled symbols associated with the uplink grant). Additionally, or alternatively, in some aspects, the allowed uplink transmission pattern may include a maximum allowed transmit power that the UE 120 can use before the next scheduling message (e.g., 23 dBm). For example, if the UE 120 is located relatively close to the base station 110, the UE 120 may not need to use a maximum available transmit power. In such cases, the UE 120 can use a lower transmit power to increase the quantity of slots or symbols that are available for uplink transmissions. In this way, configuring the DCI message to indicate the maximum allowed transmit power until the next scheduling message may provide the UE 120 with more flexibility to self-determine how to allocate available transmit power, increase or decrease the quantity of symbols or slots available for uplink transmissions, and/or the like while adhering to an overall SAR energy limit.

Additionally, or alternatively, in some aspects, the base station 110 may configure an RRC message to indicate an allowed uplink transmission pattern that may be designed to guarantee long-term compliance with the SAR requirement over a particular period (e.g., a few milliseconds). For example, while the UE 120 is in an RRC connected state, the base station 110 may configure an RRC IE that includes a quantity of slots and/or symbols available for FDD uplink transmission over the particular period, a maximum allowed transmit power that the UE 120 can use during the particular period, and/or the like. In this way, configuring the RRC message may guarantee long-term compliance with the SAR requirement over a longer period with less configuration overhead than the DCI message, which may conserve resources that the base station 110 would otherwise consume configuring and transmitting multiple DCI messages, network resources that would otherwise be consumed to transport or otherwise communicate the multiple DCI messages, resources that the UE 120 would otherwise consume receiving, decoding, and acting on the multiple DCI messages, and/or the like.

As further shown in FIG. 8, and by reference number 820, the base station 110 may transmit, and the UE 120 may receive, a single scheduling message related to activating the uplink transmission pattern configured by the base station 110. For example, in some aspects, the single scheduling message may include an RRC message related to uplink SPS scheduling, a DCI message to activate an uplink transmission pattern indicated in a previous RRC message, and/or the like. For example, the RRC message may indicate a scheduling periodicity, an expiration timer, a resource configuration, and/or the like for each band, carrier, and/or the like associated with the uplink SPS scheduling. Additionally, or alternatively, in cases where the single scheduling message is a DCI message to activate an uplink transmission pattern indicated in a previous RRC message, the previous RRC message may indicate the scheduling periodicity and expiration timer for each band, carrier, and/or the like, and the DCI message may indicate the resource configuration for each band, carrier, and/or the like. Furthermore, in some aspects, the DCI message may include an SPS-RNTI that is included in the content of the DCI message, scrambled with a CRC associated with the DCI message, and/or the like.

Additionally, or alternatively, the single scheduling message that is transmitted by the base station 110 and received by the UE 120 may include an RRC message with a specific IE related to an uplink configured grant. For example, as described elsewhere herein, the IE included in the RRC message may include a list of frequencies, bands, carriers, and/or the like associated with the uplink configured grant, a resource configuration and slot-level time offset for each frequency, band, and/or carrier, and/or the like (e.g., slots that are available and/or unavailable for uplink transmissions, and/or the like).

Additionally, or alternatively, the single scheduling message that is transmitted by the base station 110 and received by the UE 120 may include a DCI message that indicates an allowed uplink transmission pattern to be in effect until a next scheduling message to guarantee short-term compliance with an SAR requirement, an RRC message that indicates an allowed uplink transmission pattern to be in effect for a particular period to guarantee long-term compliance with the SAR requirement, and/or the like. For example, as described elsewhere herein, the allowed uplink transmission pattern may include information to indicate a quantity of slots and/or symbols that are available for uplink transmissions, a maximum allowed transmit power, and/or the like.

As further shown in FIG. 8, and by reference number 830, the UE 120 may transmit information in one or more available uplink symbols that are identified based at least in part on the cross-carrier uplink transmission pattern indicated in the single scheduling message. For example, when a DCI message is received to activate an uplink SPS configuration, the UE 120 may identify the SPS-RNTI that is included in the DCI content, scrambled with the CRC, and/or the like to identify the resources (e.g., symbols, RBs, and/or the like) to be used for uplink transmissions via the Pcell operating in the TDD mode, the Scell(s) operating in the FDD and/or TDD mode, and/or the like.

Additionally, or alternatively, when an RRC message is received to provide a band-specific uplink configured grant IE, the UE 120 may identify the frequencies and/or bands, the frequency and time resources for each frequency and/or band, slot-level offset, and/or the like based at least in part on one or more fields or elements included in the IE, as described elsewhere herein. Furthermore, the UE 120 may perform one or more repetitions of the transmissions in one or more consecutive slots that are indicated as available in the uplink configured grant IE, avoid performing repetitions of the transmissions in one or more slots that are indicated as unavailable in the uplink configured grant IE, and/or the like.

Additionally, or alternatively, when a DCI scheduling message, an RRC scheduling message, and/or the like is received to indicate an allowed uplink transmission pattern designed to guarantee short-term and/or long-term compliance with an SAR requirement, the UE 120 may derive a pattern (e.g., quantity) of slots or symbols that are available for uplink transmissions based at least in part on the values indicated in the scheduling message. Furthermore, in some aspects, the UE 120 may prioritize certain channels when deriving the slots or symbols. For example, in some aspects, the UE 120 may prioritize a physical uplink control channel (PUCCH), a physical random access channel (PRACH), a sounding reference signal (SRS) channel, and/or the like, which the UE 120 may prioritize over a data channel when deriving the pattern of slots or symbols that are available for uplink transmissions.

As indicated above, FIG. 8 is provided as an example. Other examples may differ from what is described with regard to FIG. 8.

Figure 9:
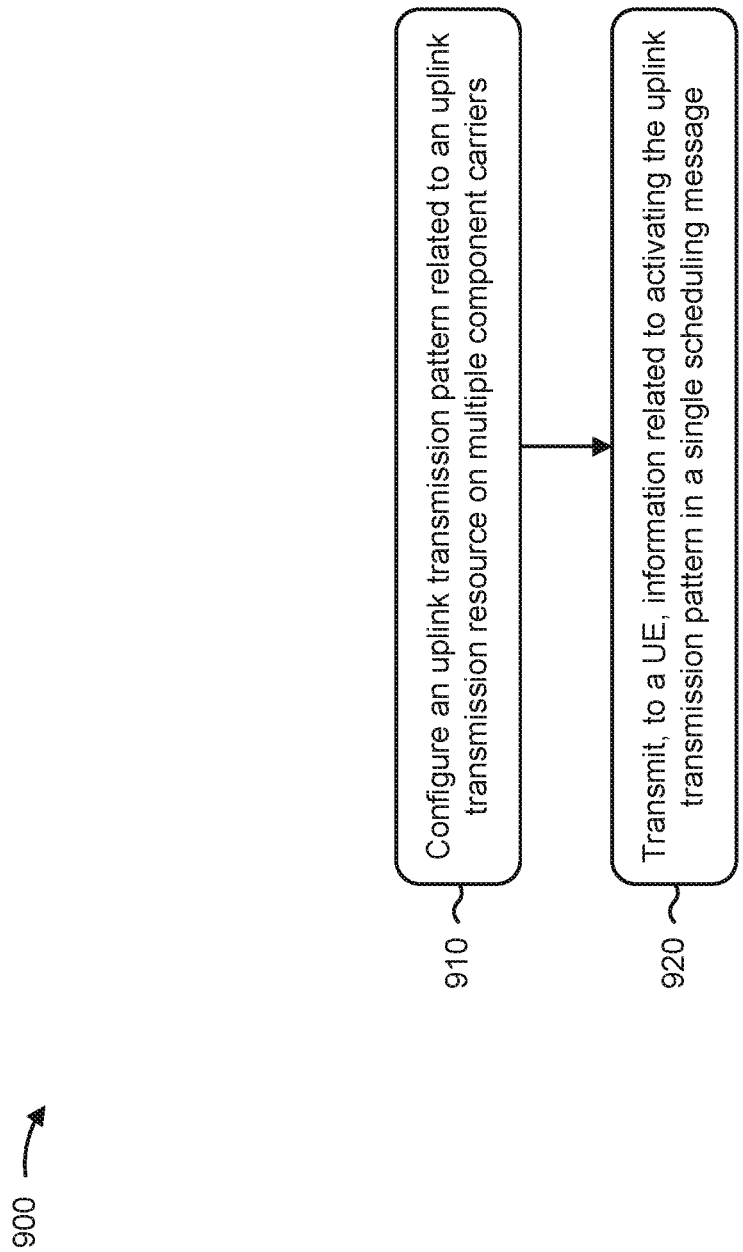
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110 and/or the like) performs operations associated with uplink cross-carrier scheduling for TDM carrier aggregation.

As shown in FIG. 9, in some aspects, process 900 may include configuring an uplink transmission pattern related to an uplink transmission resource on multiple component carriers (block 910). For example, the base station (e.g., using controller/processor 240, memory 242, and/or the like) may configure an uplink transmission pattern related to an uplink transmission resource on multiple component carriers, as described above.

As further shown in FIG. 9, in some aspects, process 900 may include transmitting, to a UE, information related to activating the uplink transmission pattern in a single scheduling message (block 920). For example, the base station (e.g., using controller/processor 240, memory 242, transmit processor 220, TX MIMO processor 230, MOD 232, antenna 234, and/or the like) may transmit, to a UE, information related to activating the uplink transmission pattern in a single scheduling message, as described above.

Process 900 may include additional aspects, such as any single aspect or any combination of aspects described below and/or in connection with one or more other processes described elsewhere herein.

In a first aspect, the single scheduling message is a DCI message or an RRC message.

In a second aspect, alone or in combination with the first aspect, the single scheduling message is an RRC message that includes at least a scheduling periodicity and information related to an expiration timer for each of the multiple component carriers based at least in part on the uplink transmission resource relating to an uplink SPS configuration.

In a third aspect, alone or in combination with one or more of the first and second aspects, the RRC message further includes information related to a resource configuration for each of the multiple component carriers.

In a fourth aspect, alone or in combination with one or more of the first through third aspects, the base station transmits, to the UE, a DCI message that includes information related to a resource configuration for each of the multiple component carriers.

In a fifth aspect, alone or in combination with one or more of the first through fourth aspects, the DCI message is associated with an SPS-RNTI that is included in content of the DCI message or used to scramble a CRC associated with the DCI message.

In a sixth aspect, alone or in combination with one or more of the first through fifth aspects, the single scheduling message is an RRC IE that includes information related to one or more of the multiple component carriers, a resource configuration for each of the multiple component carriers, or a slot-level time offset for each of the multiple component carriers based at least in part on the uplink transmission resource relating to an uplink configured grant configuration.

In a seventh aspect, alone or in combination with one or more of the first through sixth aspects, the RRC IE indicates one or more slots that are unavailable for uplink transmission using the uplink transmission resource.

In an eighth aspect, alone or in combination with one or more of the first through seventh aspects, the single scheduling message is a DCI message comprising information related to a limit on a SAR that is effective until a next scheduling message.

In a ninth aspect, alone or in combination with one or more of the first through eighth aspects, the DCI message includes at least one element to notify the UE that the uplink transmission pattern is to be in effect until the next scheduling message.

In a tenth aspect, alone or in combination with one or more of the first through ninth aspects, the at least one element in the DCI message identifies one or more slots or symbols that are available for uplink transmissions and a maximum allowed uplink transmit power until the next scheduling message.

In an eleventh aspect, alone or in combination with one or more of the first through tenth aspects, the single scheduling message is an RRC message comprising information related to a limit on an SAR when the UE is in an RRC connected state.

In a twelfth aspect, alone or in combination with one or more of the first through eleventh aspects, the RRC message includes at least one IE to identify one or more slots or symbols available for uplink transmissions and a maximum allowed uplink transmit power over a time period.

In a thirteenth aspect, alone or in combination with one or more of the first through twelfth aspects, the information related to activating the uplink transmission pattern enables the UE to derive one or more symbols that are available for uplink transmissions on the multiple component carriers.

In a fourteenth aspect, alone or in combination with one or more of the first through thirteenth aspects, the uplink transmission pattern is based at least in part on hard coded information stored in a memory of the base station or scheduling information that is determined by the base station and transparent to the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
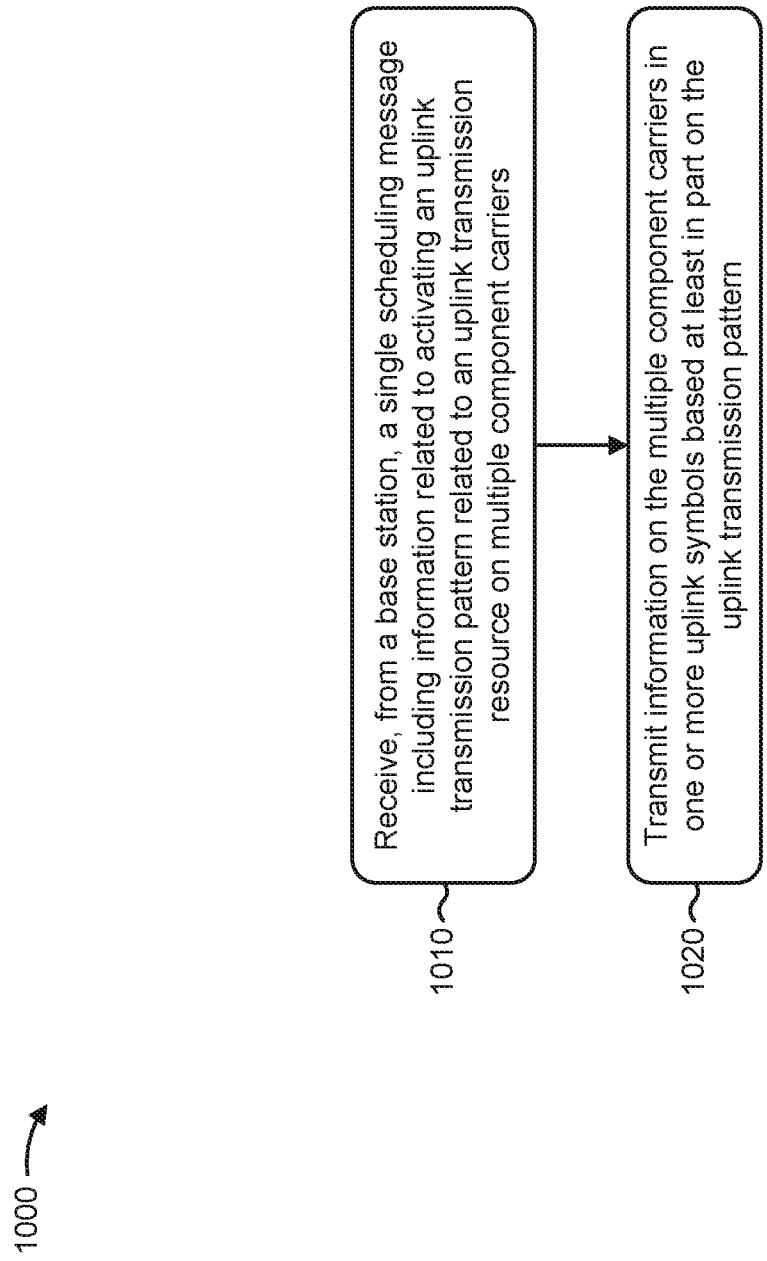
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with uplink cross-carrier scheduling for time division multiplexing carrier aggregation.

As shown in FIG. 10, in some aspects, process 1000 may include receiving, from a base station, a single scheduling message including information related to activating an uplink transmission pattern related to an uplink transmission resource on multiple component carriers (block 1010). For example, the UE (e.g., using antenna 252, DEMOD 254, MIMO detector 256, receive processor 258, controller/processor 280, memory 282, and/or the like) may receive, from a base station, a single scheduling message including information related to activating an uplink transmission pattern related to an uplink transmission resource on multiple component carriers, as described above.

As further shown in FIG. 10, in some aspects, process 1000 may include transmitting information on the multiple component carriers in one or more uplink symbols based at least in part on the uplink transmission pattern (block 1020). For example, the UE (e.g., using controller/processor 280, memory 282, transmit processor 264, TX MIMO processor 266, MOD 254, antenna 252, and/or the like) may transmit information on the multiple component carriers in one or more uplink symbols based at least in part on the uplink transmission pattern, as described above.

Process 1000 may include additional aspects, such as any single aspect or any combination of aspects described below and/or in connection with one or more other processes described elsewhere herein.

In a first aspect, the single scheduling message is a DCI message or an RRC message.

In a second aspect, alone or in combination with the first aspect, the single scheduling message is an RRC message that includes at least a scheduling periodicity and information related to an expiration timer for each of the multiple component carriers based at least in part on the uplink transmission resource relating to an uplink SPS configuration.

In a third aspect, alone or in combination with one or more of the first and second aspects, the RRC message further includes information related to a resource configuration for each of the multiple component carriers.

In a fourth aspect, alone or in combination with one or more of the first through third aspects, the UE receives, from the base station, a DCI message that includes information related to a resource configuration for each of the multiple component carriers.

In a fifth aspect, alone or in combination with one or more of the first through fourth aspects, the DCI message is associated with an SPS-RNTI that is included in content of the DCI message or used to scramble a CRC associated with the DCI message.

In a sixth aspect, alone or in combination with one or more of the first through fifth aspects, the single scheduling message is an RRC IE that includes information related to one or more of the multiple component carriers, a resource configuration for each of the multiple component carriers, or a slot-level time offset for each of the multiple component carriers based at least in part on the uplink transmission resource relating to an uplink configured grant configuration.

In a seventh aspect, alone or in combination with one or more of the first through sixth aspects, the RRC IE indicates one or more slots that are unavailable for uplink transmission using the uplink transmission resource.

In an eighth aspect, alone or in combination with one or more of the first through seventh aspects, the single scheduling message is a DCI message comprising information related to a limit on an SAR that is effective until a next scheduling message.

In a ninth aspect, alone or in combination with one or more of the first through eighth aspects, the DCI message includes at least one element to notify the UE that the uplink transmission pattern is to be in effect until the next scheduling message.

In a tenth aspect, alone or in combination with one or more of the first through ninth aspects, the at least one element in the DCI message identifies one or more slots or symbols that are available for uplink transmissions and a maximum allowed uplink transmit power until the next scheduling message.

In an eleventh aspect, alone or in combination with one or more of the first through tenth aspects, the single scheduling message is an RRC message comprising information related to a limit on an SAR when the UE is in an RRC connected state.

In a twelfth aspect, alone or in combination with one or more of the first through eleventh aspects, the RRC message includes at least one IE to identify one or more slots or symbols available for uplink transmissions and a maximum allowed uplink transmit power over a time period.

In a thirteenth aspect, alone or in combination with one or more of the first through twelfth aspects, the information related to activating the uplink transmission pattern enables the UE to derive one or more symbols that are available for uplink transmissions on the multiple component carriers.

In a fourteenth aspect, alone or in combination with one or more of the first through thirteenth aspects, the uplink transmission pattern is based at least in part on hard coded information stored in a memory of the base station or scheduling information that is determined by the base station and transparent to the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
   configuring an uplink transmission pattern related to an uplink transmission resource on multiple component carriers for a user equipment (UE),
   wherein the uplink transmission pattern indicates an availability of a set of slots, symbols, or subframes of the multiple component carriers for performing one or more uplink transmissions or one or more repetitions of an uplink transmission on the uplink transmission resource; and
   transmitting, to a user equipment (UE), information related to activating the uplink transmission pattern in a single scheduling message,
   wherein the single scheduling message is a downlink control information (DCI) message comprising information indicating a limit on a specific absorption rate that is effective until a next scheduling message or wherein the single scheduling message is a radio resource control (RRC) message and comprises information indicating a limit on a specific absorption rate that is effective when the UE is in an RRC connected state.

2. The method of claim 1, wherein the single scheduling message comprises the RRC message that includes at least a scheduling periodicity and information related to an expiration timer for each of the multiple component carriers based at least in part on the uplink transmission resource relating to an uplink semi-persistent scheduling (SPS) configuration.

3. The method of claim 2, wherein the RRC message further includes information related to a resource configuration for each of the multiple component carriers.

4. The method of claim 2, wherein the DCI message comprises information related to a resource configuration for each of the multiple component carriers.

5. The method of claim 4, wherein the DCI message is associated with an SPS radio network temporary identifier (SPS-RNTI) that is included in content of the DCI message or used to scramble a cyclic redundancy code associated with the DCI message.

6. The method of claim 1, wherein the single scheduling message is an RRC information element (IE) that includes information related to one or more of the multiple component carriers, a resource configuration for each of the multiple component carriers, or a slot-level time offset for each of the multiple component carriers based at least in part on the uplink transmission resource relating to an uplink configured grant configuration.

7. The method of claim 6, wherein the RRC IE indicates one or more slots that are unavailable for uplink transmission using the uplink transmission resource.

8. The method of claim 1, wherein the DCI message includes at least one element to notify the UE that the uplink transmission pattern is to be in effect until the next scheduling message.

9. The method of claim 8, wherein the at least one element in the DCI message identifies one or more slots or symbols that are available for uplink transmissions and a maximum allowed uplink transmit power until the next scheduling message.

10. The method of claim 1, wherein the RRC message includes at least one information element to identify one or more slots or symbols available for uplink transmissions and a maximum allowed uplink transmit power over a time period.

11. The method of claim 1, wherein the information related to activating the uplink transmission pattern enables the UE to derive one or more symbols that are available for uplink transmissions on the multiple component carriers.

12. The method of claim 1, wherein the uplink transmission pattern is based at least in part on hard coded information that is stored in a memory of the base station or scheduling information that is determined by the base station and transparent to the UE.

13. The method of claim 1, wherein the single scheduling message interrupts usage of the uplink transmission resource.

14. A method of wireless communication performed by a user equipment (UE), comprising:
receiving, from a base station, a single scheduling message including information related to activating an uplink transmission pattern related to an uplink transmission resource on multiple component carriers,
wherein the single scheduling message is a downlink control information (DCI) message comprising information indicating a limit on a specific absorption rate that is effective until a next scheduling message or wherein the single scheduling message is a radio resource control (RRC) message and comprises information indicating a limit on a specific absorption rate that is effective when the UE is in an RRC connected state, and
wherein the uplink transmission pattern indicates an availability of a set of slots, symbols, or subframes of the multiple component carriers for performing one or more uplink transmissions or one or more repetitions of an uplink transmission on the uplink transmission resource; and
transmitting information on the multiple component carriers in one or more uplink symbols based at least in part on the uplink transmission pattern.

15. The method of claim 14, wherein the RRC message includes at least a scheduling periodicity and information related to an expiration timer for each of the multiple component carriers based at least in part on the uplink transmission resource relating to an uplink semi-persistent scheduling (SPS) configuration.

16. The method of claim 15, wherein the RRC message further includes information related to a resource configuration for each of the multiple component carriers.

17. The method of claim 15, wherein the DCI message includes information related to a resource configuration for each of the multiple component carriers.

18. The method of claim 17, wherein the DCI message is associated with an SPS radio network temporary identifier (SPS-RNTI) that is included in content of the DCI message or used to scramble a cyclic redundancy code associated with the DCI message.

19. The method of claim 14, wherein the single scheduling message is an RRC information element (IE) that includes information related to one or more of the multiple component carriers, a resource configuration for each of the multiple component carriers, or a slot-level time offset for each of the multiple component carriers based at least in part on the uplink transmission resource relating to an uplink configured grant configuration.

20. The method of claim 19, wherein the RRC IE indicates one or more slots that are unavailable for uplink transmission using the uplink transmission resource.

21. The method of claim 14, wherein the DCI message includes at least one element to notify the UE that the uplink transmission pattern is to be in effect until the next scheduling message.

22. The method of claim 21, wherein the at least one element in the DCI message identifies one or more slots or symbols that are available for uplink transmissions and a maximum allowed uplink transmit power until the next scheduling message.

23. The method of claim 14, wherein the RRC message includes at least one information element to identify one or more slots or symbols available for uplink transmissions and a maximum allowed uplink transmit power over a time period.

24. The method of claim 14, wherein the information related to activating the uplink transmission pattern enables the UE to derive one or more symbols that are available for uplink transmissions on the multiple component carriers.

25. The method of claim 14, wherein the uplink transmission pattern is based at least in part on hard coded information that is stored in a memory of the base station or scheduling information that is determined by the base station and transparent to the UE.

26. The method of claim 14, wherein the single scheduling message interrupts usage of the uplink transmission resource.

27. A base station for wireless communication, comprising:
a memory; and
one or more processors coupled to the memory, the memory and the one or more processors configured to:
configure an uplink transmission pattern related to an uplink transmission resource on multiple component carriers; and
transmit, to a user equipment (UE), information related to activating the uplink transmission pattern in a single scheduling message,
wherein the single scheduling message is a downlink control information (DCI) message comprising information indicating a limit on a specific absorption rate that is effective until a next scheduling message or wherein the single scheduling message is a radio resource control (RRC) message and comprises information indicating a limit on a specific absorption rate that is effective when the UE is in an RRC connected state, and wherein the uplink transmission pattern indicates an availability of a set of slots, symbols, or subframes of the multiple component carriers for performing one or more uplink transmissions or one or more repetitions of an uplink transmission on the uplink transmission resource.

28. A user equipment (UE) for wireless communication, comprising:

a memory; and one or more processors coupled to the memory, the memory and the one or more processors configured to:

receive, from a base station, a single scheduling message including information related to activating an uplink transmission pattern related to an uplink transmission resource on multiple component carriers, wherein the single scheduling message is a downlink control information (DCI) message comprising information indicating a limit on a specific absorption rate that is effective until a next scheduling message or wherein the single scheduling message is a radio resource control (RRC) message and comprises information indicating a limit on a specific absorption rate that is effective when the UE is in an RRC connected state, and wherein the uplink transmission pattern indicates an availability of a set of slots, symbols, or subframes of the multiple component carriers for performing one or more uplink transmissions or one or more repetitions of an uplink transmission on the uplink transmission resource; and transmit information on the multiple component carriers in one or more uplink symbols based at least in part on the uplink transmission pattern.

* * * * *